No. 829,608. PATENTED AUG. 28, 1906.
H. T. STANTON.
FISHING CORK OR FLOAT.
APPLICATION FILED AUG. 23, 1905.
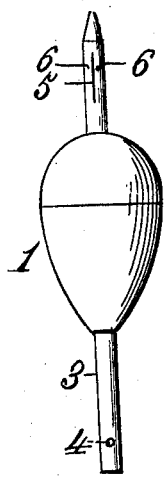
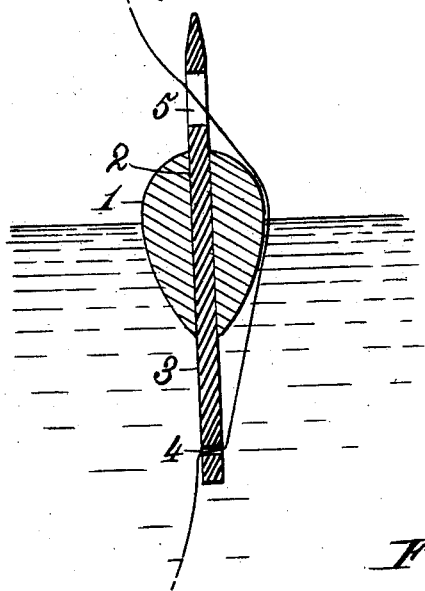
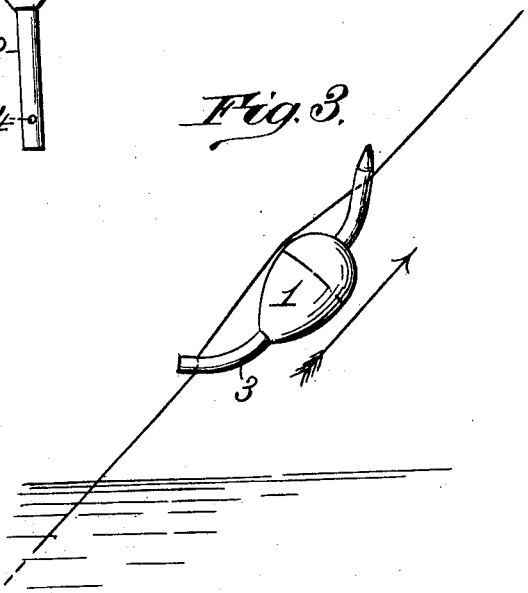
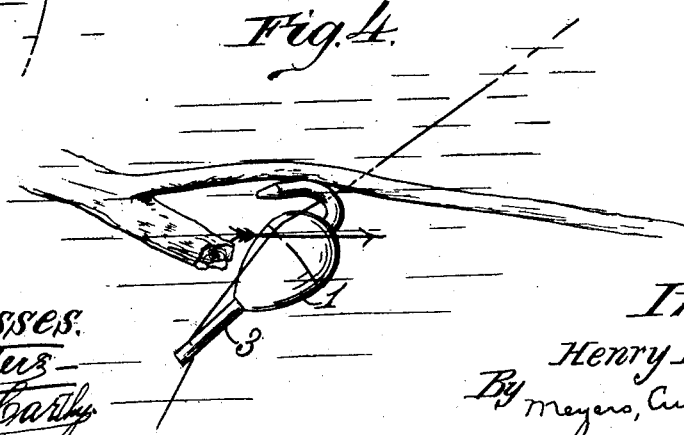
Witnesses.
Inventor.
Henry T. Stanton.
By Meyers, Cushman & Rea,
Attorneys.

UNITED STATES PATENT OFFICE.

HENRY T. STANTON, OF TUXEDO PARK, ST. LOUIS COUNTY, MISSOURI.

FISHING CORK OR FLOAT.

No. 829,608.

Specification of Letters Patent.

Patented Aug. 28, 1906.

Application filed August 23, 1905. Serial No. 275,498.

*To all whom it may concern:*

Be it known that I, HENRY T. STANTON, a citizen of the United States, residing at Tuxedo Park, in the county of St. Louis, State of Missouri, have invented certain new and useful Improvements in Fishing Corks or Floats, of which the following is a full, clear, and exact specification.

My invention relates to improvements in corks or floats for fishing-lines, and has for its object to provide such a device having a novel stem adapted for simple, firm, and easily adjustable connection to the line and which is flexible and resilient, whereby the float may be released from entanglement with a brushheap or other obstruction (an occurrence frequently met with by fishermen) and without danger of breaking the stem.

Heretofore it has been customary in fishing corks or floats to provide a stem of wood or of quill, generally provided with special means for attachment to the fishing-line, as by means of metal rings or otherwise. Such stems are objectionable in that they break readily under strain, and the line is liable to become entangled in or cut or sawed or otherwise damaged by the attaching devices that serve to connect the float with the line.

My invention consists in the fishing cork or float hereinafter described and the novel stem thereof.

That which is regarded as new will be set forth in the appended clauses of claim.

In the accompanying drawings, illustrating the invention, Figure 1 is an elevation of the float. Fig. 2 is a central section. Fig. 3 is a view illustrating the bending capacity of the float-stem. Fig. 4 is a view showing the float-stem caught in a branch and illustrating the manner in which the float may be released without breaking the stem.

The reference-numeral 1 in said drawings designates the cork or float body, which may be made of any sutiable material, such as wood or cork, and of any suitable shape, preferably of the ordinary pear or buoy shape, and is provided with a central longitudinal setm-bore 2 to receive the stem.

The stem is designated by the reference-numeral 3, and consists of a solid pencil of rubber conforming in cross-sectional size and shape to the bore 2, and of a length to pass longitudinally into said bore and have its ends project from the opposite ends of the float, as shown, for the purpose of connection to the fishing-line and supporting the cork or float in proper fishing relation to the line. For this purpose of connection the stem is provided in one of its exposed or projecting ends with a transverse or diametrical bore or hole 4, extending entirely through the stem and of cross-sectional proportion approximately very slightly greater than the fishing-line, sufficient to permit the line to be drawn therethrough readily when it is desired to shift or adjust the cork or float upon the line.

In the end of the stem which projects from the top of the float a slit 5 is cut through the stem, resulting in the provision of spring-lips 6, between which the line may be passed and which clamp the line with a firm pressure sufficient to maintain the position of the float upon the line except when the fisherman desires to adjust it to a different position. By reason of the yielding or springy nature of the clamping-lips they will permit the line to be easily drawn therethrough by the fisherman in the operation of adjusting the float to different positions on the line, as illustrated, for example, in Fig. 3.

The stem will preferably be of such cross-section as compared to the corresponding proportion of the bore that it may by manual manipulation be readily introduced into and withdrawn from the float in the initial assembly, or, if necessary, for renewal of the stem, and yet when so incorporated with the float-body will have frictional engagement with the wall of the bore throughout the length of the latter, whereby it is connected to the float with such firmness that its relation thereto will not be disturbed in actual fishing use.

The projecting ends of the stem, as stated, are flexible and resilient, whereby they will bend—for example, as shown in Fig. 4—in the event of being entangled with a brushheap or other obstruction and facilitate the release of the cork from such obstruction, obviating the objections heretofore stated as characteristic of the common wooden or quill type of stems.

The means provided for connection of the float to the line are simple and efficient and enable the float to be easily adjusted along the line, present no opportunity for the line becoming entangled with the stem, and avoid the possibility of the line becoming cut or sawed or otherwise damaged.

The cork may be readily adjusted along the line by sliding it up or down as necessity may require.

Having thus described my invention, what I claim is—

1. A fishing-line float provided with a stem having resilient ends projecting from opposite ends of the float-body said stem provided with openings through its projecting ends to receive a fishing-line for connection of the float to the line.

2. A fishing-line float provided with a stem having resilient ends projecting from opposite ends of the float-body, one of said ends having a transverse opening therethrough and the other having a transverse slit providing a spring-line clamp.

3. A fishing-line float consisting of a body and a solid stem of rubber combined therewith and having its ends projecting from opposite ends of the body, said projecting ends being provided with openings extending therethrough for reception of the fishing-line.

4. A fishing-line float consisting of a body and a solid stem of rubber combined therewith, and having its ends projecting from opposite ends of the body, one of said projecting ends being provided with a transverse opening entirely therethrough and the other having a transverse slit providing a spring-line clamp.

HENRY T. STANTON.

Witnesses:
J. L. HOWELL,
WILLIAM M. THOMAS.